United States Patent
Vervaeke

(10) Patent No.: US 11,021,283 B2
(45) Date of Patent: Jun. 1, 2021

(54) METHOD FOR TRANSFERRING PRE-INCUBATED EGGS TO A POULTRY HOUSE AND TRANSFER MACHINE USED THEREWITH

(71) Applicant: VERVAEKE-BELAVI, Tielt (BE)

(72) Inventor: Steven Vervaeke, Tielt (BE)

(73) Assignee: VERVAEKE-BELAVI, Tielt (BE)

( * ) Notice: Subject to any disclaimer, the term of this patent is extended or adjusted under 35 U.S.C. 154(b) by 118 days.

(21) Appl. No.: 16/099,393

(22) PCT Filed: May 10, 2017

(86) PCT No.: PCT/IB2017/052725
§ 371 (c)(1),
(2) Date: Nov. 6, 2018

(87) PCT Pub. No.: WO2017/195128
PCT Pub. Date: Nov. 16, 2017

(65) Prior Publication Data
US 2020/0062432 A1 Feb. 27, 2020

(30) Foreign Application Priority Data
May 11, 2016 (BE) .................................. 2016/5334

(51) Int. Cl.
*B65B 23/08* (2006.01)
*A01K 1/015* (2006.01)
(Continued)

(52) U.S. Cl.
CPC .............. *B65B 23/08* (2013.01); *A01K 1/015* (2013.01); *A01K 31/19* (2013.01); *A01K 41/00* (2013.01); *A01K 43/00* (2013.01); *A01K 45/00* (2013.01)

(58) Field of Classification Search
CPC .... A01K 1/015; A01K 1/0152; A01K 1/0154; A01K 1/0155; A01K 1/0157;
(Continued)

(56) References Cited

U.S. PATENT DOCUMENTS 3,061,352 A 10/1962 Hirt
3,077,993 A * 2/1963 Mulvany ................. B65B 23/08
414/627

(Continued)

FOREIGN PATENT DOCUMENTS

EP 2873319 A1 5/2015
NL 1012453 C1 1/2001
(Continued)

OTHER PUBLICATIONS

International Search Report dated Sep. 1, 2017, issued in corresponding International Application No. PCT/IB2017/052725, filed May 10, 2017, 2 pages.
(Continued)

*Primary Examiner* — Dean J Kramer
(74) *Attorney, Agent, or Firm* — Christensen O'Connor Johnson Kindness PLLC

(57) ABSTRACT

A method is provided, wherein the eggs which are pre-incubated in setter trays are transferred to the poultry house in these setter trays. In the poultry house, a layer of insulating covering material is provided on the floor of the poultry house, in one or more strips. The covering material comprises, in particular, litter which is applied in a layer thickness of at least 2 cm. By a set of egg pickup members of a transfer machine, the pre-incubated eggs are removed in the poultry house from the setter trays, after which they are positioned on the covering material by the transfer machine.
(Continued)

In this way, the eggs can be placed in the poultry house efficiently, with a minimal risk of damage to the eggs a high hatching rate being ensured.

20 Claims, 1 Drawing Sheet

(51) Int. Cl.
*A01K 31/19* (2006.01)
*A01K 41/00* (2006.01)
*A01K 43/00* (2006.01)
*A01K 45/00* (2006.01)
*A01K 21/00* (2006.01)

(58) Field of Classification Search
CPC ........ A01K 31/22; A01K 41/00; A01K 43/00; B65B 23/08; B65G 2201/0208; A22C 21/0053
USPC ...................................................... 294/87.12
See application file for complete search history.

(56) References Cited

U.S. PATENT DOCUMENTS

| | | | |
|---|---|---|---|
| 3,132,735 A | 5/1964 | Nilsen | |
| 3,230,001 A * | 1/1966 | Hirt | A01K 43/00 294/184 |
| 3,506,140 A * | 4/1970 | Koch | B65B 23/08 414/736 |
| 4,230,071 A * | 10/1980 | Phillips | A01K 31/165 119/440 |
| 4,411,574 A * | 10/1983 | Riley | B65B 21/20 198/432 |
| 6,857,390 B1 * | 2/2005 | Maendel | A01K 1/015 111/199 |
| 2007/0189888 A1 * | 8/2007 | Tanner | B66F 9/02 414/672 |
| 2011/0264306 A1 * | 10/2011 | Bagge | B66F 9/182 701/2 |
| 2015/0166267 A1 * | 6/2015 | Suh | A01K 43/00 414/416.01 |

FOREIGN PATENT DOCUMENTS

| | | |
|---|---|---|
| WO | 01/00013 A1 | 1/2001 |
| WO | 02/34039 A1 | 5/2002 |
| WO | 2016/053088 A1 | 4/2016 |

OTHER PUBLICATIONS

Written Opinion of the International Searching Authority dated Sep. 1, 2017, issued in corresponding International Application No. PCT/IB2017/052725, filed May 10, 2017, 7 pages.

* cited by examiner

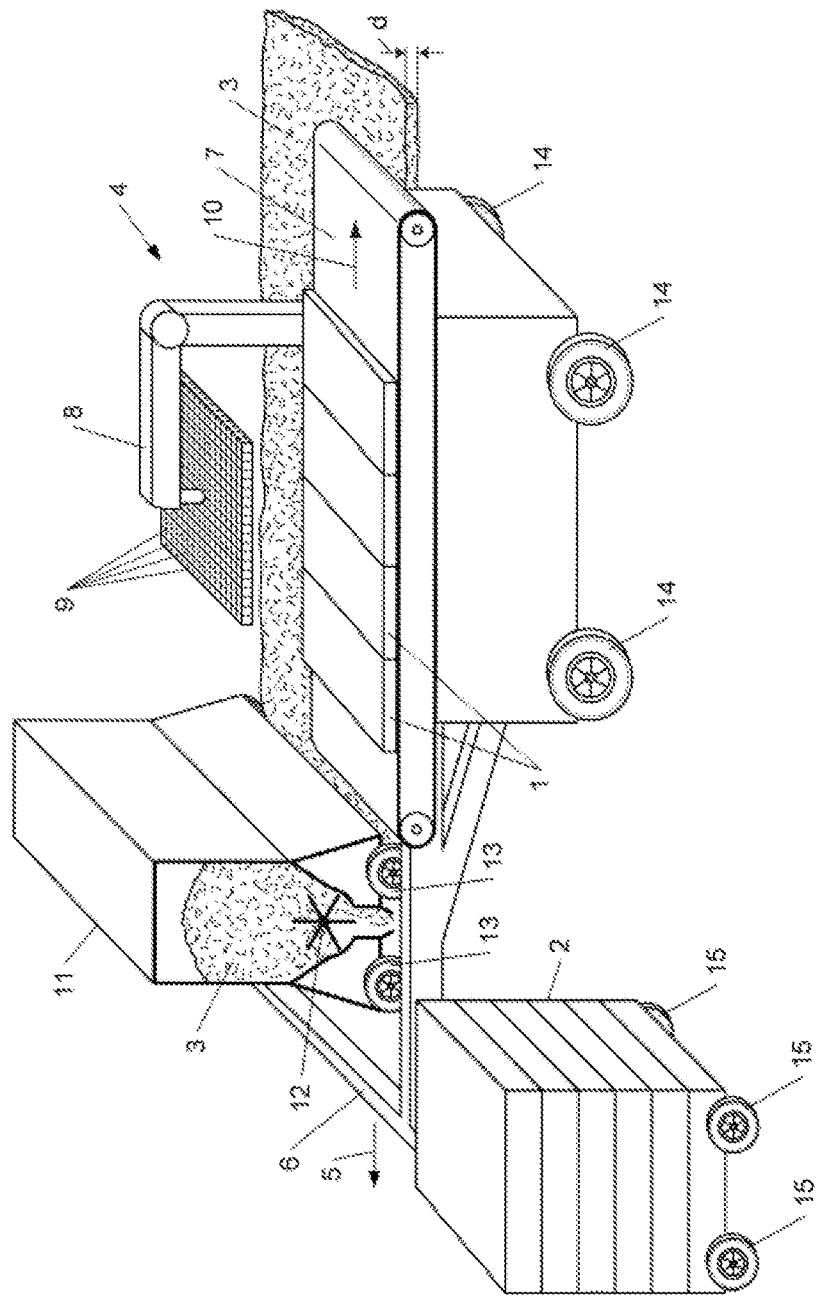

METHOD FOR TRANSFERRING PRE-INCUBATED EGGS TO A POULTRY HOUSE AND TRANSFER MACHINE USED THEREWITH

BACKGROUND

Embodiments of the current disclosure relate to a method of transferring eggs to a poultry house, in particular a broiler house, the eggs being pre-incubated in setter trays. The pre-incubated eggs are transferred to the poultry house in the setter trays themselves. The chicks then hatch in the poultry house, which promotes the welfare of the birds. After all, the chicks no longer have to be transported and also immediately have feed and water at their disposal.

In practice, the problem arose that the pre-incubated eggs do not hatch simultaneously. For example, in the case of chickens, there are eggs that already hatch after 19 days, while some eggs only hatch after 21 days. If the eggs hatch in a hatchery and if the day-old chicks are transported to the poultry house, this means that some of the chicks will be without food or drink for 2 to 3 days. During the transport of the chicks and the preparation thereof, the chicks are also packed closely together. This has not only adverse effects on bird welfare but also on the growth and development of the chicks and on their susceptibility to disease.

To avoid this, new systems were developed in which pre-incubated eggs—which, in particular, were pre-incubated for 18 days—were brought to the poultry house where the eggs could then hatch. In the so-called X-Treck system, the pre-incubated eggs, together with the setter trays in which they are located, are placed on a transport system suspended in the poultry house. The temperature of the eggs in the setter trays can then be controlled by raising the transport system in the poultry house up to a height where it is warmer, or lowering it to a height where it is colder. Especially nearing the hatching of the eggs, the temperature thereof increases because the activity of the chick in the egg increases. The transport system is then located at a slight height above the floor of the poultry house so that the chicks can jump off the transport system and onto the poultry house floor. With the so-called 'Patio system', several transport systems for the setter trays are provided above each other, each with a conveyor belt under it covered with litter on which the chicks can live until they are ready for slaughter. The aeration of the various levels is done by a horizontal air flow as described in NL 1012453. The advantage of this Patio system is that less space is required in the poultry house, but the system is of course even more expensive than the X-Treck system.

EP 2 873 319 relates to the X-Treck system in which the setter trays containing the pre-incubated eggs are placed on a raising system in the poultry house. According to this patent application, the raising system is required to allow the temperature of the eggs to be controlled since eggs placed on the poultry house floor have a lower hatching rate.

In view of the cost, the complexity of the maintenance, and the additional work involved in cleaning the system, these known systems are only applied on a limited scale in practice. Because the day-old chicks hatch in the setter trays and continue to walk on them for some time, the setter trays are fouled by the manure of the newly hatched chicks. As a result, there is a real risk of infection of the setter trays with germs, especially with harmful bacteria such as *Salmonella*. Due to the risk of contamination, as well as the cost of both systems, poultry farmers are not inclined to place such a system in their poultry houses. Due to the complex design of the setter trays with the high degree of openness that is needed for controlling the temperature of the eggs during setting, the setter trays are also difficult to clean. In particular, the setter trays have many corners and edges where infections or manure—which can be infected with, for example, *Salmonella*—is not easy to remove. A further disadvantage of allowing the chicks to hatch in the setter tray itself is that due to its great openness, there is a problem with the welfare of the birds. Indeed, the newly hatched chicks can hurt themselves on the many corners and edges that are present in the setter trays to hold the eggs while maintaining a high degree of openness for the required air flow. As a result, the chicks can get stuck in the setter trays.

In EP 1 414 291, another system for letting eggs hatch in the poultry house is described. As shown schematically in this patent, the pre-incubated eggs are not allowed to hatch in the setter trays, but the pre-incubated eggs are laid on a sheet of paper on a layer of litter. Food and water are also provided for the newly hatched chicks on this sheet of paper. To keep the temperature of the eggs under control, the eggs are placed in a closed cart or a cover is laid over the eggs when they are placed on the poultry house floor itself.

Although the possibility is indicated in EP 1 414 291 of placing the pre-incubated eggs on a sheet of paper on top of the litter layer, this was never practiced, in particular, not in the Patio system and in the X-Treck system. In a poultry house, several thousand or even tens of thousands, for example 40,000, pre-incubated eggs must be put in place, and efficiently, such that little time is needed to put the pre-incubated eggs in place. In view of the cost of manual labour, if the eggs were to be laid down loose in the poultry house, this would need to be done quickly, which is not only very taxing, among other things, due to the high temperature in the poultry house, but would also result in a high risk of damaging the eggs. Towards hatching time, the eggshells become much more brittle, so the eggs must be handled softly, in particular, to prevent the formation of hairline cracks in the eggshells. In the case of hairline cracks, the chicks in the eggs will dry out faster, causing them to weaken and become more susceptible to infections. As a result, fewer eggs will hatch, generally substantially 15% less if the eggs have hairline cracks, and more antibiotic treatments will be needed to fight bacterial infections. Such antibiotic treatments have been under pressure in recent years and should be avoided as much as possible.

To prevent the transmission of contamination via the setter trays, WO 2016/053088 proposes transferring the pre-incubated eggs from the setter trays to a cardboard container before the eggs are transported to the poultry house.

The pre-incubated eggs are thus transported from the hatchery to the poultry house in these cardboard containers. This system is used in practice under the name 'One2Born'. The cardboard containers consist of egg cartons containing additional holes for the aeration of the eggs and for controlling their temperature. The containers stand on cardboard legs so that the eggs are not directly on the floor of the poultry house.

Despite the fact that the cardboard containers are biodegradable, they create extra waste in the poultry house that has to be removed. A further disadvantage of the cardboard containers is that they are delivered in folded form and that a considerable amount of manual labour is required to set up the containers. Not only purchasing the cardboard containers, but also setting them up, thus involves additional costs. In the hatchery itself, the eggs also still need to be transferred into the cardboard containers. It has been found in practice that such a transfer step each time causes an additional average loss of approximately 0.5%, especially if the eggs are to be positioned in the pockets provided for this purpose in the egg cartons. Indeed, the eggs will not always be positioned completely correctly in relation to these pockets, so that they will make contact the walls of the pockets when placing them in the pockets. Due to the fragility of the eggshells, this will cause a considerable amount of hairline cracks in the eggshells.

SUMMARY

An object of the present disclosure is therefore to provide a new method of transferring pre-incubated eggs to a poultry house in which a transfer step in the hatchery and the associated risk of additional loss is avoided because the eggs are transferred to the poultry house in the setter trays themselves. A further object of the new method is to avoid the risk of transmitting infections via the setter trays while maintaining an efficient placement of the eggs in the poultry house and a high outcome of healthy day-old chicks from the eggs in the poultry house.

To this end, the method according to the present disclosure is characterized in that a layer of insulating covering material is provided in the poultry house and the pre-incubated eggs are removed in the poultry house from the setter trays by a set of egg pickup members of a transfer machine and subsequently positioned on the covering material by the transfer machine. The covering material preferably comprises litter, which is put, in particular, on the poultry house floor.

According to the present disclosure, the eggs are not allowed to hatch in the setter trays, but the eggs in the poultry house are directly transferred from the setter trays to the covering material that has been provided in the poultry house. This covering material is formed in particular by litter which has been applied to the floor of the poultry house in the desired layer thickness in one or more strips. The setter trays can thus not be fouled by the manure produced by the day-old chicks. Because in practice the poultry house is disinfected before each new load of chicks, and is provided with a new litter layer, there is also no risk that the setter trays will become infected. Physical contact between the setter trays and the materials in the poultry house can also be easily avoided. Moreover, disinfection of the setter trays is very simple as the setter trays themselves are not fouled.

An important advantage of the method according to the present disclosure is further that damage to the eggs, and in particular the formation of hairline cracks, is easy to avoid and that in this regard, the risk of damage to the eggs can in particular be even smaller than when the eggs have to be transferred to the cardboard containers in the One2born system. After all, in the method according to the present disclosure, the eggs are taken out of the setter trays by a transfer machine and positioned on a covering material that is relatively soft compared to, for example, the cardboard containers, or also compared to the bottom of the hatching trays into which the pre-incubated eggs are transferred in a hatchery with a fixed transfer machine. In the method according to the present disclosure, only one transfer step is required, namely the transfer of the pre-incubated eggs from the setter trays to the covering material on the poultry house floor. Because this covering material is softer than the bottom of the existing hatching trays, the risk of damage to the eggs is in fact even smaller. This is especially the case when the covering material comprises litter. A further advantage of transferring the eggs from the setter trays to the covering material on the poultry house floor via a transfer machine is that a transfer machine can pick up a whole set of eggs simultaneously and position them on the litter layer, such that thousands to tens of thousands of eggs can easily be transferred to the litter layer per hour with the transfer machine, without damaging them.

According to the present disclosure, it was further found that, contrary to what is stated in EP 2 873 319, the hatching rate of the eggs in the poultry house is not lower than the hatching rate of the same eggs in the hatchery when the pre-incubated eggs are laid on the floor of the poultry house. The worse result described in EP 2 873 319 is presumably due to the fact that the eggs were laid on the usual litter layer, which has only a minimal thickness to limit the amount of litter required. In the method according to the present disclosure, however, better insulation is provided at the location of the eggs between the eggs and the floor of the poultry house, for example, a thicker layer of the insulating covering material, thereby simultaneously reducing the risk of damage to the eggs.

Preferably, the covering material is placed on the poultry house floor in one or more strips, the eggs being placed on these strips.

Because the covering material only needs to be applied in the required layer thickness at the location of the eggs, only a limited amount of additional covering material is required for the proper insulation of the eggs. This covering material may in particular comprise litter, which is the same or different from the litter with which the entire floor of the poultry house is covered.

In a particular embodiment of the method according to the present disclosure, the layer of covering material on which the eggs are positioned has an average thickness of at least 2 cm, preferably at least 3 cm, and more preferably at least 4 cm.

These thicknesses are significantly larger than the usual thickness of the litter layer provided in poultry houses. The better insulation rating of a thicker layer allows a reduction of the hatching rate to be avoided.

In a preferred embodiment of the method according to the present disclosure, the eggs are positioned in pockets in the covering material by the transfer machine, the pockets preferably being applied in the covering material by the transfer machine and the eggs preferably being placed in an upright position in the pockets, with the pointed end of the eggs facing downwards.

By placing the eggs in pockets in the covering material, the eggs can be placed in the desired position, in particular, with their pointed end down, to obtain the highest possible hatching rate. In this way, the insulation of the eggs can also be controlled. The deeper the eggs are placed in the covering material, the more they will be insulated from the ambient air.

If necessary, additional insulation may be applied to the eggs, for example, an additional amount of covering material or a sheet, in particular, a sheet of paper that can be easily removed after, or approaching, the hatching of the eggs.

In a further preferred embodiment of the method according to the present disclosure, the pre-incubated eggs are located at a predetermined interrelated position in the setter trays and the eggs are positioned at a further interrelated position, which differs from the predetermined interrelated position, on the covering material, by adjusting the interrelated position of the egg pickup members after they have removed the eggs from the setter trays to the further interrelated position. In particular, in the further interrelated position, the eggs are farther apart than in the predetermined interrelated position.

According to the present disclosure, it was found that the distance between the eggs has a significant effect on the temperature thereof. For example, the outer row of eggs of a strip of eggs will have a lower temperature than the eggs located in the middle of the strip. By placing the eggs at a somewhat larger distance from each other the temperature of the eggs can be prevented from getting too high towards hatching time.

In yet a further preferred embodiment of the method according to the present disclosure, the set of egg pickup members comprises at least 30, preferably at least 50, and more preferably at least 100 egg pickup members.

By providing a larger number of egg pickup members on the transfer machine, the capacity thereof can be increased such that the required number of eggs can be placed in a poultry house in a short time.

The present disclosure further relates to a transfer machine, in particular, a transfer machine for use in the method according to the present disclosure, the transfer machine having a set of egg pickup members for picking up pre-incubated eggs in the poultry house and which transfer machine being further provided for driving through the poultry house and in the process positioning the pre-incubated eggs picked up by the egg pickup members on a layer of insulating covering material in a poultry house. The egg pickup members are specifically provided for removing the pre-incubated eggs from the setter trays.

Preferably, the transfer machine will be provided with wheels for driving through the poultry house.

In a preferred embodiment of the transfer machine according to the present disclosure, it is self-propelled.

In a further preferred embodiment of the transfer machine according to the present disclosure, the transfer machine is provided for driving on the poultry house floor and positioning the pre-incubated eggs on the poultry house floor.

DESCRIPTION OF THE DRAWINGS

Further advantages and features of the present disclosure will be apparent from the following description of some preferred embodiments of the method according to the present disclosure and of the transfer machine used therein. However, this description is only given as an example and is not intended to limit the scope of protection as defined by the claims. The reference signs given in the description relate to the appended drawings wherein:

The FIGURE schematically shows a perspective view of a transfer machine which can be used in the method according to the present disclosure for applying a strip of litter to the poultry house floor and for transferring pre-incubated eggs from the setter trays onto the applied strip of litter.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In general, the present disclosure relates to a method for transferring eggs to a poultry house that have been pre-incubated in setter trays 1. The poultry house is in particular a broiler house but the poultry house may also be used to produce eggs instead of meat, for example, consumption eggs, but in particular the fertilized eggs of so-called 'dams' intended to be hatched. The term 'poultry house' must be understood in a broad sense and comprises every space in which poultry is kept, both for meat production and for the production of eggs. The term 'poultry house' shall thus be taken to mean the usual poultry houses that usually have only one level, and moreover those that can have several floors and which are used, in particular, for so-called 'vertical farming'.

In the case of chicken eggs, the eggs are preferably transferred to the poultry house after the eggs have been pre-incubated for approximately 18 days. As the first eggs will hatch only after 19 days, there is no risk that the eggs would already hatch during the transport or during the transfer in the poultry house.

The method according to the present disclosure can also be applied to the eggs of other types of poultry, for example, the eggs of turkeys, guinea fowl, ducks, geese, quail, pigeons, pheasants, patrons and other poultry.

In practice, there are different setter trays for incubating chicken eggs. An example of this is the standard setter tray 'Tray B00568' of the Petersime company. This setter tray is provided for 10 rows of 15 eggs, that is, for a total of 150 eggs.

For the transport of the eggs to the poultry house, the setter trays 1 are placed in carts 2, with wheels 15, which are then transported by a truck. The advantage of transporting the eggs by the setter trays is that no transfer step is required, which always causes a certain amount of damage to the eggs.

According to the present disclosure, a layer of insulating covering material 3 is provided in the poultry house on which the pre-incubated eggs are positioned from the setter trays 1 by a transfer machine 4. The insulating covering material 3 is applied in particular in one or more strips to the poultry house floor. The insulating covering material 3 can be formed by a mat, for example, a mat made of plastic foam, but preferably litter is used for this purpose, such as, for example, flax straw, sawdust, wood shavings and the like.

In the FIGURE, a possible embodiment of a transfer machine 4 that can be used for the transfer of the eggs is shown schematically. This machine 4 is a self-propelled machine, provided with wheels 14, which drives forward in the poultry house during the transfer of the eggs in the direction of the arrow 5. At the front of the transfer machine 4 coupling arms 6 are provided, to which one of the carts 2 with the setter trays 1 can be coupled 4 on the left hand side of the machine 4, in such a way that it travels along with the transfer machine 4 in the poultry house. On top of the transfer machine 4, a belt conveyor 7 (or a roller system) is provided on which the operator of the machine 4 must place the setter trays 1. With this belt conveyor 7, the setter trays 1 on the machine 4 are transported in the direction of the arrow 10 to the rear thereof. A robotic arm 8 is further provided on the machine 4, to the end of which a set of egg pickup members 9 are attached. With these egg pickup members 9, the eggs are removed from the setter trays 1 and then positioned on the covering material 3. When removing the eggs from the setter trays 1, the belt conveyor 7 is preferably stopped, so as to pick up the eggs as carefully as possible. When placing the eggs on the covering material 3, the transfer machine 4 is further preferably stopped, so as to be able to place the eggs on the covering material 3 as carefully as possible. Alternatively, it is also possible that the egg pickup members 9 do not position the eggs directly on the covering material 3 but, for example, on a roll of paper, which is transferred from the machine 4 and placed on the covering material 3 after the eggs are placed thereon. At the rear of the machine, the operator must remove the empty setter trays 1 and put them back in the cart 2. During all this, the setter trays 1 therefore do not come into contact with the poultry house or with the litter placed therein so that there is no risk of contamination of the setter trays.

The egg pickup members 9 of the transfer machine 4 have, for example, suction cups, with which they can grasp the eggs by suction. Alternatively, the eggs can also be grasped by spring-loaded fingers, but suction cups are preferred because they involve the least risk of damage to the eggs. In practice, such egg pickup members 9 are already used in the stationary transfer machines used in hatcheries to transfer pre-incubated eggs from setter trays 1 into hatching trays.

An example of this is the Petersime Transferring Machine, which has 150 suction cups, allowing it to transfer 150 eggs from a single setter tray to a hatching tray in one go.

Compared to this known transfer machine, the robotic arm 8 of the transfer machine shown in the FIGURE has more movement options and is also longer, such that with this robotic arm 8, not only can the eggs be lifted from the setter trays 1, but they can also be positioned on the covering material 3 on the floor of the poultry house. Due to the greater displacement to be achieved by the robotic arm 8, the machine 4 preferably comprises a set of egg pickup members 9, the number of which will correspond to the number of eggs in two (or even more) of the setter trays 1. As a result, the capacity of the machine can be increased to, for example, 45,000 eggs per hour.

In order to be able to control the distance between the eggs on the covering material 3, the egg pickup members 9 are preferably moveable relative to each other such that their interrelated position can be adjusted after lifting the eggs from the setter trays 1. In this way, it is specifically possible to position the eggs at a greater distance from each other on the covering material 3, such that the temperature increase of the eggs can be better controlled towards hatching time. The eggs can possibly also be held in several groups, for example, in groups of four, wherein the distance between these groups of eggs can be controlled.

To keep the eggs sufficiently warm, the layer of covering material 3 applied to the floor of the poultry house under the eggs should preferably have an average thickness d of at least 2 cm, more preferably of at least 3 cm, and most preferably of at least 4 cm. After transferring the eggs to this covering material 3, additional insulation may be provided, for example, by covering the eggs with a sheet, such as a sheet of paper or a plastic film. It is also possible, for example, to sprinkle extra litter on the eggs. However, the use of a sheet has the advantage that it can be taken away again when the eggs are about to hatch so as to avoid increasing the temperature of the eggs too much towards hatching time.

To control the temperature of the eggs, it is preferable to monitor a number of the eggs. The temperature in the poultry house can then be adjusted to the temperature of the eggs. Measuring the eggshell temperature can be done manually by, for example, an infrared thermometer, but there are also automatic systems for monitoring the temperature of the eggshells, such as the OvoScan™ system. This is currently being used for monitoring and controlling the temperature in hatchers in hatcheries and would therefore only need to be adapted to the climate control system of a poultry house.

In the covering material 3 pockets may be provided in which the eggs are then placed. These pockets allow the eggs to be placed in upright position, with their pointed end down, in order to obtain a higher hatching rate. The depth of the pockets also has an effect on the insulation of the eggs. The pockets are preferably made in the covering material by the transfer machine 4. This can, for example, be done simply by a roller with spikes which are pressed into the covering material while advancing the machine 4.

If the covering material 3 comprises a roll of foam which is unrolled onto the floor of the poultry house, it can already be provided with pockets for the eggs in advance. If desired, the eggs on top of the machine can be transferred into these pockets, after which, the foam is then, for example, lowered via an inclined surface onto the floor of the poultry house.

If the eggs are positioned in one or more strips on the covering material, it is preferable to provide the eggs along the sides of these strips with extra insulation by providing more covering material along those sides. In the case of litter, this can be swept together along the sides so as to obtain an increase in height. This can possibly be done after the eggs have been transferred, such that the litter can be swept up to the outer row of eggs.

The litter that is placed under the eggs can, but does not have to be, the same as the litter with which the remaining part of the floor of the poultry house is covered. Preferably, the entire floor of the poultry house is first covered with a thin layer of litter, after which an additional layer of litter (the same or different) or covering material is applied on top of that at the locations where the eggs will be positioned.

The strip or strips of covering material 3 on which the eggs will be laid can be placed in the poultry house in advance. In the embodiment shown in the FIGURE, however, the covering material 3 is also applied in the poultry house with the transfer machine 4. To this end, a device 11 for applying the covering material 3 is coupled to the coupling arm 6, on the right side of the machine 4. If the covering material 3 is a roll of foam, this can simply be a holder, with which this roll is unrolled onto the floor of the poultry house. If the covering material 3 comprises litter, the apparatus 11 is a spreader with which the litter is sprinkled in the desired thickness d onto the floor of the poultry house. This is done, for example, by a rotor 12 driven by the wheels 13 of the spreader. Preferably the spreader will have a control with which the amount of litter sprinkled on the floor of the poultry house can be controlled. For example, this control could comprise a controllable coupling between the wheels 13 of the spreader and the rotor 12 with which the relationship between the number of revolutions of the wheels 13 and the number of revolutions of the rotor 12 can be adjusted.

The above-described transfer machine 4 allows the eggs to be placed in any place in the poultry house. In order to reduce the heating costs, it is preferable to measure where it is the hottest in the poultry house in advance. This may depend on the heating system but also the wind direction. Based on the measured temperatures, it can then be determined where the eggs will be laid, namely at the place where the temperature is as optimal as possible for the eggs to be hatched. Usually this will be in the hottest place in the poultry house, unless cooling in the poultry house is required, which, however, would be very exceptional.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for transferring eggs to a poultry house that have been pre-incubated in setter trays, the pre-incubated eggs being transferred to the poultry house in said setter trays, the method comprising:
   providing a layer of insulating covering material in the poultry house;
   removing the pre-incubated eggs in the poultry house from the setter trays by a set of egg pickup members of a transfer machine; and subsequently
   positioning the pre-incubated eggs on said covering material by the transfer machine,
   wherein the transfer machine drives through the poultry house during the transfer of the eggs from the setter trays to said covering material.

2. The method according to claim 1, wherein the pre-incubated eggs are positioned on said covering material by said set of egg pickup members.

3. The method according to claim 1, wherein said eggs are located at a predetermined interrelated position in said setter trays and the eggs are positioned at a further interrelated position, which differs from said predetermined interrelated position, on said covering material, by adjusting the interrelated position of said egg pickup members after they have removed the eggs from the setter trays to said further interrelated position.

4. The method according to claim 3, wherein the eggs are located farther apart from each other in said further interrelated position than in said predetermined interrelated position.

5. The method according to claim 1, wherein the number of egg pickup members in said set corresponds to the number of eggs in one or in more of the setter trays, and wherein for each of the setter trays, the eggs contained therein are removed from the setter tray simultaneously by said set of egg pickup members.

6. The method according to claim 1, wherein said set of egg pickup members comprises at least 30 egg pickup members.

7. The method according to claim 6, wherein said set of egg pickup members comprises at least 100 egg pickup members.

8. The method according to claim 1, wherein said egg pickup members comprise suction cups for grasping the eggs by suction.

9. The method according to claim 1, wherein the eggs are positioned in pockets in the covering material by said transfer machine.

10. The method according to claim 1, wherein additional insulation is applied to at least a portion of the eggs positioned on the covering material.

11. The method according to claim 1, wherein the layer of covering material on which the eggs are positioned has an average thickness of at least 2 cm.

12. The method according to claim 1, wherein the eggs are positioned in at least one strip on the covering material, wherein along the sides of said strip, the eggs are provided with extra insulation by providing an increase in height of said covering material along those sides.

13. The method according to claim 1, wherein the covering material comprises litter.

14. The method according to claim 1, wherein said covering material is applied on the poultry house floor.

15. The method according to claim 1, wherein the transfer machine stops each time when the eggs are being positioned on the covering material.

16. The method according to claim 1, wherein the temperature is measured at different places in the poultry house, and the measured temperatures are used to determine where the eggs will be placed in the poultry house.

17. A method for transferring eggs to a poultry house that have been pre-incubated in setter trays, the pre-incubated eggs being transferred to the poultry house in said setter trays, the method comprising:
   providing a layer of insulating covering material in the poultry house;
   removing the pre-incubated eggs in the poultry house from the setter trays by a set of egg pickup members of a transfer machine; and subsequently
   positioning the pre-incubated eggs on said covering material by the transfer machine, wherein the eggs are positioned in pockets in the covering material by said transfer machine.

18. The method according to claim 17, wherein said pockets are applied in the covering material by said transfer machine and the eggs being positioned in the pockets in an upright position.

19. The method according to claim 17, wherein the layer of covering material on which the eggs are positioned has an average thickness of at least 2 cm.

20. A method for transferring eggs to a poultry house that have been pre-incubated in setter trays, the pre-incubated eggs being transferred to the poultry house in said setter trays, the method comprising:
   providing a layer of insulating covering material in the poultry house;
   removing the pre-incubated eggs in the poultry house from the setter trays by a set of egg pickup members of a transfer machine; and subsequently
   positioning the pre-incubated eggs on said covering material by the transfer machine, wherein the eggs are positioned in at least one strip on the covering material, wherein along the sides of said strip, the eggs are provided with extra insulation by providing an increase in height of said covering material along those sides.

* * * * *